(12) United States Patent
Lee

(10) Patent No.: US 10,531,407 B1
(45) Date of Patent: Jan. 7, 2020

(54) POWER CONTROL FOR OFDMA SDMA

(71) Applicant: NEWRACOM, INC., Irvine, CA (US)

(72) Inventor: Daewon Lee, Irvine, CA (US)

(73) Assignee: NEWRACOM, INC., Lake Forest, CA (US)

( * ) Notice: Subject to any disclaimer, the term of this patent is extended or adjusted under 35 U.S.C. 154(b) by 144 days.

(21) Appl. No.: 14/933,927

(22) Filed: Nov. 5, 2015

Related U.S. Application Data

(60) Provisional application No. 62/075,696, filed on Nov. 5, 2014.

(51) Int. Cl.
*H04W 52/42* (2009.01)
*H04W 72/04* (2009.01)

(52) U.S. Cl.
CPC ......... *H04W 52/42* (2013.01); *H04W 72/042* (2013.01); *H04W 72/046* (2013.01); *H04W 72/0453* (2013.01)

(58) Field of Classification Search
CPC ............... H04W 52/42; H04W 72/042; H04W 72/0453; H04W 72/046
See application file for complete search history.

(56) References Cited

U.S. PATENT DOCUMENTS

| | | | | |
|---|---|---|---|---|
| 9,980,280 | B2* | 5/2018 | Guan | H04W 72/1268 |
| 2011/0194423 | A1* | 8/2011 | Cho | H04W 52/04 |
| | | | | 370/252 |
| 2011/0199990 | A1* | 8/2011 | Chang | H04W 52/54 |
| | | | | 370/329 |
| 2013/0039286 | A1* | 2/2013 | Larsson | H04W 52/146 |
| | | | | 370/329 |
| 2014/0087782 | A1* | 3/2014 | Zhang | H04W 52/242 |
| | | | | 455/522 |
| 2014/0269580 | A1* | 9/2014 | Huang | H04W 52/146 |
| | | | | 370/329 |
| 2016/0119881 | A1* | 4/2016 | Merlin | H04W 52/146 |
| | | | | 370/328 |

* cited by examiner

*Primary Examiner* — Kevin C. Harper
*Assistant Examiner* — Henry Baron

(57) ABSTRACT

A method comprises transmitting a downlink frame initiating an uplink multi-user transmission. The uplink multi-user transmission includes a plurality of uplink frames simultaneously transmitted by a plurality of respective stations. The downlink frame including power control information for the plurality of uplink frames. The method further includes receiving the uplink multi-user transmission that is transmitted based on the power control information. Another method comprises receiving a downlink frame initiating an uplink multi-user transmission. The uplink multi-user transmission includes a plurality of uplink frames simultaneously transmitted by a plurality of respective stations. The downlink frame including power control information for the plurality of uplink frames. The method further comprises participating in the uplink multi-user transmission based on the power control information.

13 Claims, 6 Drawing Sheets

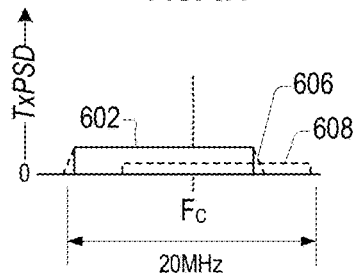
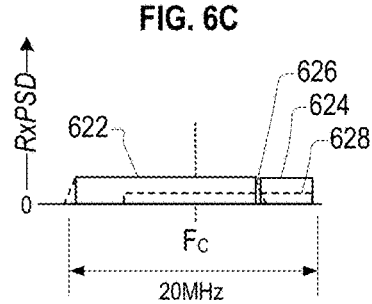
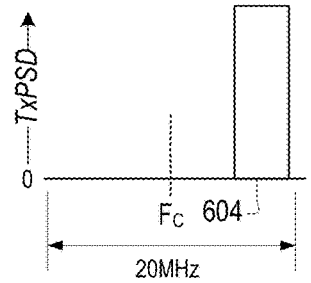
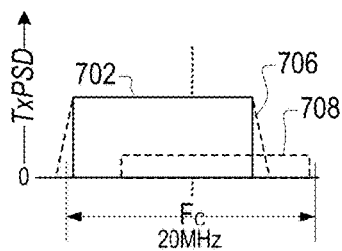
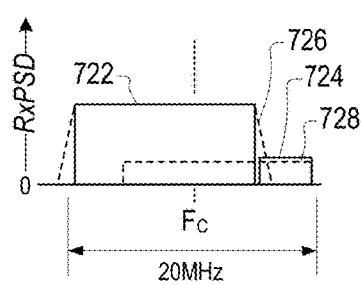
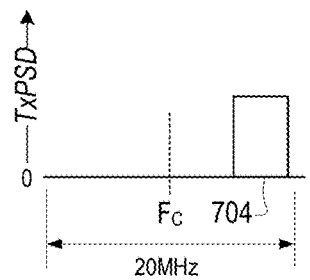
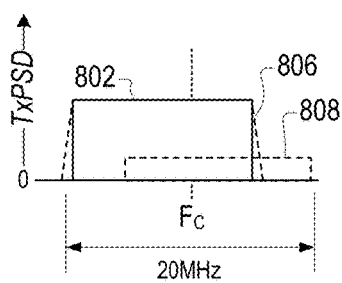
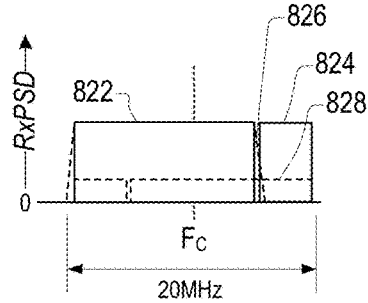
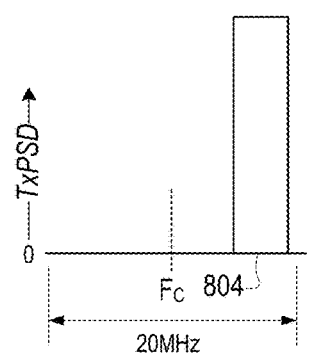

POWER CONTROL FOR OFDMA SDMA

CROSS-REFERENCE TO RELATED APPLICATION

This application claims the benefit of U.S. Provisional Application No. 62/075,696, filed on Nov. 5, 2014, the contents of which are incorporated herein by reference.

BACKGROUND

1. Technical Field

The technology described herein relates generally to wireless networking. More particularly, the technology relates to controlling transmission powers of a plurality of stations (STAs) in a Wireless Local Area Network (WLAN) wherein the plurality of STAs may perform simultaneous transmissions to an Access Point (AP).

2. Description of the Related Art

Wireless LAN (WLAN) devices are currently being deployed in diverse environments. Some of these environments have large numbers of access points (APs) and non-AP stations in geographically limited areas. In addition, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

A WLAN is being standardized by the IEEE (Institute of Electrical and Electronics Engineers) Part 11 under the name of "Wireless LAN Medium Access Control (MAC) and Physical Layer (PHY) Specifications." A series of standards have been adopted as the WLAN evolved, including IEEE Std 802.11™-2012 (March 2012) (hereinafter, IEEE Std 802.11). The IEEE Std 802.11 was subsequently amended by IEEE Std 802.11Ae™-2012, IEEE Std 802.11Aa™-2012, IEEE Std 802.11Ad™-2012, and IEEE Std 802.11Ac™-2013 (hereinafter, IEEE 802.11ac).

Power control in systems based on the IEEE Std 802.11 has seen limited development because the medium access control mechanisms of IEEE Std 802.11, such as Carrier Sense Multiple Access/Collision Avoidance (CSMA/CA), allow only a single device within a reception area to transmit at any given time. Therefore, the transmission power of a device relative to other devices was not important, and in particular a first signal from a first device have a power level at a receiver that was higher than a power level at the receiver of a second signal from a second device did not create interference because the first and second signals would be separated in time.

Recently, an amendment focused on providing a high efficiency WLAN in high-density scenarios is being developed by the IEEE 802.11ax task group. The 802.11.ax amendment focuses on improving metrics that reflect user experience, such as average per station throughput, the 5th percentile of per station throughput of a group of stations, and area throughput. Improvements will be made to support environments such as wireless corporate offices, outdoor hotspots, dense residential apartments, and stadiums.

New multiuser transmission technologies such as Multi-User (MU) Multiple-input Multiple-output (MIMO) and MU Orthogonal Frequency-Division Multiple Access (OFDMA), have received much interest for next-generation Wi-Fi technology. These multiuser transmission technologies include Uplink (UL) Spatial Division Multiple Access (SDMA) and UL OFDMA, each of which permit a plurality of STAs in a Basic Service Set (BSS) to simultaneously perform transmissions to an Access Point (AP) of the BSS.

In OFDMA, several OFDM symbols are sent consecutively at each of a plurality of frequencies. Hence, OFDMA has a frequency or subcarrier dimension and a time, or OFDM symbol index, dimension. Thus, OFDMA uses two-dimensional (2D) time-frequency resources, and a subset of the 2D resources are assigned for unicasting a packet to or from a client. Simultaneously communicating with a plurality of client, such as by using a Down-Link (DL) or Up-Link (UL) OFDMA frame, may improve a medium utilization efficiency of the WLAN.

In Spatial Division Multiple Access (SDMA), a plurality of directional antennas, a plurality of lobes of a steered beam-formed array, or combinations thereof may be employed to communicate with a plurality of STAs having a plurality of respective directions relative to the AP. Each STA may have a directional antenna or a lobe of the array assigned exclusively to it for the duration of the communication.

When a plurality of simultaneously-received UL OFDMA or UL SDMA transmissions have substantially different Received Power Spectral Densities (RxPSD) at the AP, interference from a first transmission may prevent the reception of a second transmission having an RxPSD lower than the RxPSD of the first transmission. This may occur even though the two transmissions have different frequencies (such as in an UL OFDMA transmission) or are received from different directions by different directional antennas or different lobes of a beam-formed antenna array (such as in an UL SDMA transmission).

The performance of a WLAN may be improved by controlling the transmission power of STAs participating in an UL OFDMA or UL SDMA transmission so that an amount of interference that each STAs produces for other STAs is reduced.

SUMMARY

In an embodiment, a method comprises transmitting a downlink frame initiating an uplink multi-user transmission. The uplink multi-user transmission includes a plurality of uplink frames simultaneously transmitted by a plurality of respective stations. The downlink frame including power control information for the plurality of uplink frames. The method further includes receiving the uplink multi-user transmission that is transmitted based on the power control information.

In an embodiment, the power control information includes a plurality of transmission power parameters respectively corresponding to transmission powers of the plurality of uplink frames.

In an embodiment, the power control information includes a plurality of adjustment parameters for adjusting respective transmission powers of the plurality of uplink frames.

In an embodiment, the power control information includes a reference power value used to determine respective adjustment parameters for adjusting respective transmission powers for the plurality of uplink frames.

In an embodiment, the reference power value corresponds to a minimum value of respective received powers of the plurality of stations.

In an embodiment, the adjustment parameters are respectively determined using differences between the reference power value and received powers of the respective stations.

In an embodiment, the uplink multi-user transmission is i) an Uplink (UL) Orthogonal Frequency Division Multiple Access (OFDMA) communication or ii) an UL Spatial Division Multiple Access (SDMA) communication.

In an embodiment, the method further comprises determining the power control information using a measurement, by a station of the plurality of stations, of a frame received by the station.

In an embodiment, the method further comprises performing a measurement of a prior frame. The prior frame was transmitted by a station of the plurality of stations. The method further comprises determining the power control information using a result of the measurement.

In an embodiment, the method further comprises determining the power control information using respective bandwidth allocations in the uplink multi-user transmission of the plurality of stations.

In an embodiment, a method comprises receiving a downlink frame initiating an uplink multi-user transmission. The uplink multi-user transmission includes a plurality of uplink frames simultaneously transmitted by a plurality of respective stations. The downlink frame including power control information for the plurality of uplink frames. The method further comprises participating in the uplink multi-user transmission based on the power control information.

In an embodiment, the method further comprises determining a transmission power parameter associated with an uplink frame of the plurality of uplink frames. The transmission power parameter is including in the power control information. The method further comprises participating in the uplink multi-user transmission by transmitting the uplink frame using a transmission power corresponding to the transmission power parameter.

In an embodiment, the method further comprises determining an adjustment parameter associated with an uplink frame of the plurality of uplink frames. The adjustment parameter is including in the power control information. The method further comprises participating in the uplink multi-user transmission by transmitting the uplink frame using a transmission power determined using the adjustment parameter.

In an embodiment, the method further comprises determining a reference power value in the power control information, determining an adjustment parameter using the reference power value, and participating in the uplink multi-user transmission by transmitting the uplink frame using a transmission power determined using the adjustment parameter.

In an embodiment, the method further comprises determining the adjustment parameter using a difference between the reference power value and a received power.

In an embodiment, the received power is a received power of the downlink frame.

In an embodiment, the method further comprises determining the adjustment parameter using a bandwidth allocation of the uplink frame.

In an embodiment, the method further comprises determining the adjustment parameter according to equations $R'=P-10 \log 10\, BW$ and $D=R_{MIN}-R'$, wherein D is the adjustment parameter in decibels, P is a received power in decibels, BW is a bandwidth allocation of the uplink frame, and $R_{MIN}$ is the reference power value in decibels.

In an embodiment, the method further comprises determining the transmission power using the equation $P_{TX}=P_{NOM}+D$, wherein $P_{TX}$ is the transmission power and $P_{NOM}$ is i) a nominal transmission power of a non-Orthogonal Frequency Division Multiple Access frame, or ii) a maximum allowable transmission power of the uplink frame.

In an embodiment, the uplink multi-user transmission is i) an Uplink (UL) Orthogonal Frequency Division Multiple Access (OFDMA) communication or ii) an UL Spatial Division Multiple Access (SDMA) communication.

BRIEF DESCRIPTION OF THE DRAWINGS

FIGS. 6A-6C illustrate reducing interference between UL OFDMA transmissions by controlling transmission power of STAs according to an embodiment.

FIGS. 7A-7C illustrate interference between UL OFDMA transmissions in a wireless network according to an embodiment.

FIGS. 8A-8C illustrate reducing interference between UL OFDMA transmissions by controlling transmission power of STAs according to an embodiment.

DETAILED DESCRIPTION

Figure 1:
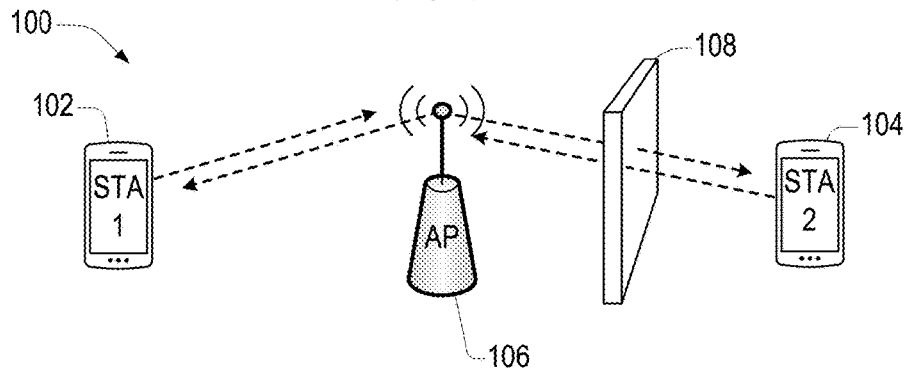
FIG. 1 illustrates a wireless network according to an embodiment.

Embodiments of the present disclosure relate generally to wireless networking, and more particularly, to simultaneous communication of signaling information to stations using different bandwidths.

In the following detailed description, certain illustrative embodiments have been illustrated and described. As those skilled in the art would realize, these embodiments may be modified in various different ways without departing from the scope of the present disclosure. Accordingly, the drawings and description are to be regarded as illustrative in nature and not restrictive. Like reference numerals designate like elements in the specification.

FIG. 1 illustrates a wireless network according to an embodiment. The wireless network includes an infrastructure Basic Service Set (BSS) 100 of a Wireless Local Area Network (WLAN). In an 802.11 wireless LAN, the BSS provides the basic building-block and typically includes an access point (AP) and one or more associated stations (STAs). In FIG. 1, the BSS 100 includes an Access Point 106 (also referred to as AP) wirelessly communicating with first and second wireless devices (or stations) 102 and 104 (also referred to as STA1 and STA2, respectively). The wireless devices may include a medium access control layer (MAC) and a physical layer (PHY) according to an IEEE 802.11 standard.

Although the example of FIG. 1 shows only the BSS 100 including only the first and second stations STA1 and STA2, embodiments are not limited thereto and may comprise BSSs including any number of STAs.

The AP 106 is a station, that is, a STA, configured to control and coordinate functions of the BSS 100. The AP 106 may transmit information to a single station selected from the plurality of stations STA1 and STA2 in the BSS 100 using a single frame, or may simultaneously transmit information to two or more (e.g., to both) stations STA1 and STA2 in the BSS 100 using either a single Orthogonal Frequency Division Multiplexing (OFDM) broadcast frame, a single OFDM Multi-User Multi-Input-Multi-Output (MU-MIMO) transmission, or a single Orthogonal Frequency Division Multiple Access (OFDMA) frame.

The stations STA1 and STA2 may transmit data to the AP 106 using a single frame, or transmit information to and receive information from each other using a single frame. The stations STA1 and STA2 may simultaneously transmit data to the AP 106 using an Uplink (UL) OFDMA frame. When the BSS 100 supports Spatial Division Multiple Access (SDMA), the stations STA1 and STA2 may simultaneously transmit data to the AP 106 using an UL MU-MIMO frame.

In another embodiment, the AP 106 may be absent and the stations STA1 and STA2 may be in an ad-hoc network.

FIG. 1 shows a wall 108 in the transmission path between the AP 106 and the station STA2. The wall 108 attenuates signals passing between the AP 106 and the station STA2. For example, the wall 108 may introduce 20 decibels (dB) of attenuation when the wall 108 includes concrete, and may introduce 6 decibels (dB) of attenuation when the wall 108 includes drywall. The signal attenuation attributable to the wall may interfere with operations of the BSS 100, as described below.

Each of the stations STA1 and STA2 and the AP 106 includes a processor and a transceiver, and may further include a user interface and a display device. The processor is configured to generate a frame to be transmitted through a wireless network, to process a frame received through the wireless network, and to execute protocols of the wireless network. The processor may perform some or all of its functions by executing computer programming instructions stored on a non-transitory computer-readable medium. The transceiver represents a unit functionally connected to the processor, and designed to transmit and receive a frame through the wireless network. The transceiver may be defined using a single component that performs the functions of transmitting and receiving, or two separate components each performing one of such functions. The processor and the transceiver may be implemented by hardware components and/or software components integrated within the respective stations STA1 and STA2 and/or the AP 106.

AP 106 may be or may include a WLAN router, a stand-alone Access Point, a WLAN bridge, a Light-Weight Access Point (LWAP) managed by a WLAN controller, and the like. In addition, a device such as a personal computer, tablet computer, or cellular phone may be able to operate as the AP 106, such as when a cellular phone is configured to operate as a wireless "hot spot."

Each of stations STA1 and STA2 may be or may include a desktop computer, a laptop computer, a tablet PC, a wireless phone, a mobile phone, a smart phone, an e-book reader, a Portable Multimedia Player (PMP), a portable game console, a navigation system, a digital camera, a Digital Multimedia Broadcasting (DMB) player, a digital audio recorder, a digital audio player, a digital picture recorder, a digital picture player, a digital video recorder, a digital video player, and the like.

The present disclosure may be applied to WLAN systems according to IEEE 802.11 standards but is not limited thereto.

In IEEE 802.11 standards, frames exchanged between stations (including access points) are classified into management frames, control frames, and data frames. A management frame may be a frame used for exchanging management information that is not forwarded to a higher layer of a communication protocol stack. A control frame may be a frame used for controlling access to a medium. A data frame may be a frame used for transmitting data to be forwarded to the higher layer of the communication protocol stack.

Each frame's type and subtype may be identified using a type field and a subtype field included in a control field of the frame, as prescribed in the applicable standard.

Figure 2:
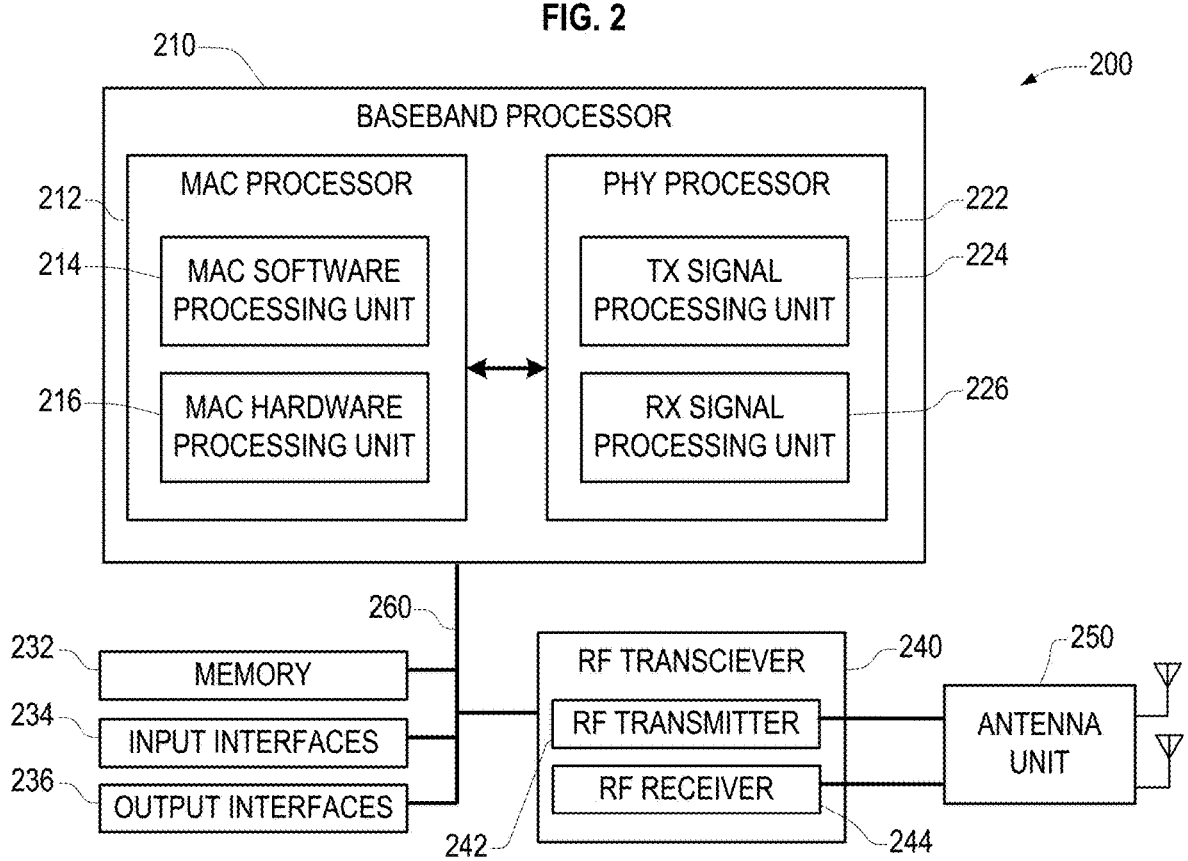
FIG. 2 is a schematic diagram of a wireless device according to an embodiment.

FIG. 2 illustrates a schematic block diagram of a wireless device 200 according to an embodiment. The wireless or WLAN device 200 can represent any device in a BSS, e.g., AP 106 or any of stations 102 and 104 in FIG. 1. The WLAN device 200 includes a baseband processor 210, a radio frequency (RF) transceiver 240, an antenna unit 250, a storage device (e.g., memory) 232, one or more input interfaces 234, and one or more output interfaces 236. The baseband processor 210, the memory 232, the input interfaces 234, the output interfaces 236, and the RF transceiver 240 may communicate with each other via a bus 260.

The baseband processor 210 performs baseband signal processing, and includes a MAC processor 212 and a PHY processor 222. The baseband processor 210 may utilize the storage device 232, which may include a non-transitory computer readable medium having software (e.g., computer programming instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware, hereinafter referred to as "MAC hardware." However, the MAC processor 212 is not limited thereto. For example, the MAC processor 212 may be configured to perform the first and second plurality of functions entirely in software or entirely in hardware according to an implementation.

The PHY processor 222 includes a transmitting signal processing unit 224 and a receiving signal processing unit 226. The PHY processor 222 implement a plurality of functions of the PHY layer. These functions may be performed in software, hardware, or a combination thereof according to implementation.

The RF transceiver 240 includes an RF transmitter 242 and an RF receiver 244. The RF transceiver 240 is configured to transmit first information received from the baseband processor 210 to the WLAN, and provide second information received from the WLAN to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beamformed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, touch screen, microphone, and the like. The output interfaces 236 may include one or more of a display device, touch screen, speaker, and the like.

As described herein, many functions of the WLAN device 200 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, and so on.

As described herein, a wide variety of electronic devices, circuits, firmware, software, and combinations thereof may be used to implement the functions of the components of the WLAN device 200. Furthermore, the WLAN device 200 may include other components, such as application processors, storage interfaces, clock generator circuits, power supply circuits, and the like, which have been omitted in the interest of brevity.

In an OFDMA frame, several OFDM symbols are sent consecutively using one or more subcarriers of a plurality of subcarriers. Therefore, transmissions have a first frequency or subcarrier dimension and a second time or OFDM symbol index dimension that define a set of two-dimensional (2D) time-frequency resources. In the OFDMA frame, a plurality of subsets of the 2D resource are respectively assigned for unicasting information to or from a plurality of clients.

With the introduction of Uplink Orthogonal Frequency Division Multiple Access (UL-OFDMA) and Uplink Spatial Division Multiple Access (UL-SDMA), transmission from multiple users will be received simultaneously by a wireless device, such as, for example, the AP 106 of the BSS 100 of FIG. 1.

Figure 3A:
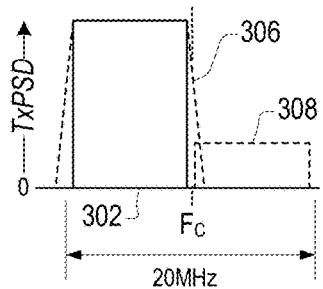
FIGS. 3A-3C illustrate interference between Up-Link (UL) Orthogonal Frequency Division Multiple Access (OFDMA) transmissions in a wireless network according to an embodiment.
Figure 3C:
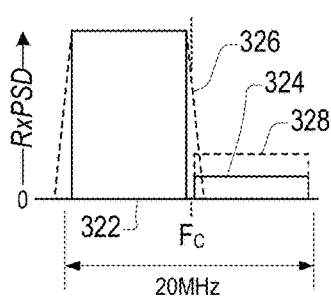
Figure 3B:
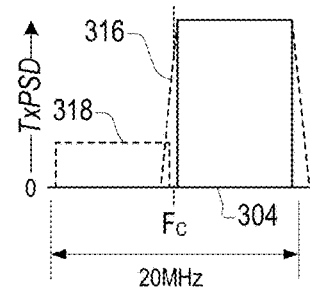

FIG. 3 shows a first scenario where transmission of packets from multiple stations without power control can cause issues at a receiving device. In FIG. 3, FIG. 3A shows a first Transmission Power Spectral Density (TxPSD) 302 of a first transmission from the station STA1 of the BSS 100 of FIG. 1. FIG. 3B shows a second TxPSD 304 of a second transmission from the station STA2 of the BSS 100. FIG. 3C shows first and second Received Power Spectral Densities (RxPSDs) 326 and 324 of the first and second transmissions at the AP 106 of the BSS 100.

FIG. 3 shows a scenario where stations STA1 and STA2 are transmitting packets simultaneously and at equal TxPSDs and equal transmission powers. STA2 has a link to the AP 106 with large path loss and/or penetration loss, in this example caused by the wall 108, which substantially attenuates the power at the AP 106 of the second transmission from the station STA2.

FIG. 3 illustrates the system performing UL-OFDMA. Accordingly, the first transmission from station STA1 may be assigned to a first set of frequency allocations (here, the left side of a 20 MHz channel) and the second transmission from the station STA2 may be assigned to the rest (here, the right side of the 20 MHz channel).

A transmitters can have RF impairments such as an I-Q imbalance, which can create mirror interference centered at the center frequency of the transmission. Accordingly, the first transmission by the station STA1 may produce a first transmitted mirror interference (TxMI) 308 in the right side of the 20 MHz channel, and the second transmission by the station STA2 may produce a second TxMI 318 in the left side of the 20 MHz channel.

In addition, a frequency offset difference of the stations STA1 and STA2 can result in a first transmitted inter-subcarrier interference (TxICI) 306 and a second TxICI 316 from the stations STA1 and STA2, respectively.

Magnitudes of the first TxMI 308 and the first TxICI 306 may be substantially lower than a magnitude of the first TxPSD 302. Magnitudes of the second TxMI 318 and the second TxICI 316 may be substantially lower than a magnitude of the second TxPSD 304.

The first TxPSD 302, the first TxMI 308, and the first TxICI 306 produced by the first transmission are attenuated by the link between the STA1 and the AP 106 to produce a first RxPSD 322, a received mirror interference (RxMI) 328, and a received inter-subcarrier interference (RxICI) 326. The second TxPSD 304 produced by the second transmission is attenuated by the link between the STA2 and the AP 106 to produce a second RxPSD 324. The second TxMI 318 and the second TxICI 316 are sufficiently attenuated by the link between the STA2 and the AP 106 that they have no effect on reception of signals at the AP 106, and therefore the respective RxMI and RxICI thereof are not shown.

Because of the higher attenuation produced by the wall 108, the second RxPSD 324 of the second transmission is lower than the RxMI 328 and the RxICI 326 in the frequencies where each of the latter overlaps the second RxPSD 324. As a result, the AP 106 may not be able to receive the second transmission.

FIG. 4 show a method of controlling transmission powers of the stations STA1 and STA2 according to an embodiment. The transmission powers are controlled to prevent the interference associated with a first transmission from a station STA1 from preventing the reception of a contemporaneous second transmission from a station STA2, such as was illustrated in FIG. 3.

Figure 4A:
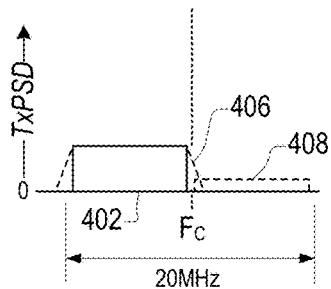
FIGS. 4A-4C illustrate reducing interference between UL OFDMA transmissions by controlling transmission power of STAs according to an embodiment.
Figure 4C:
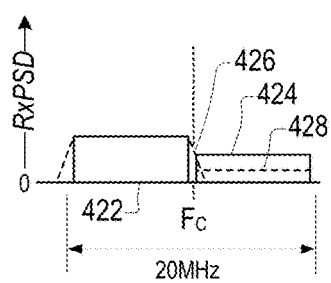
Figure 4B:
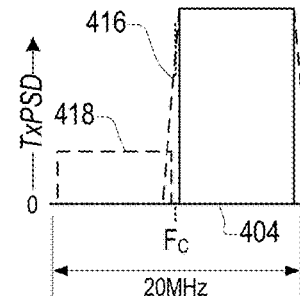

In FIG. 4, FIG. 4A shows a first TxPSD 402 of a first transmission from the station STA1 of the BSS 100 of FIG. 1. FIG. 4B shows a second TxPSD 404 of a second transmission from the station STA2 of the BSS 100. FIG. 4C shows first and second RxPSDs 322 and 324 of the first and second transmissions at the AP 106 of the BSS 100.

In FIG. 4, the transmission power of the first transmission of the station STA1 may be reduced relative to the transmission power of the second transmission of the station STA2. As a result, a first TxPSD 402, a first TxMI 408, and a first TxICI 406 are also reduced, relative to the example illustrated in FIG. 3.

The transmission power of the second transmission may remain the same as in FIG. 3 or may be increased. As a result, the second TxPSD 404, a second TxMI 418, and a second TxICI 416 will remain the same or be increased relative to the example illustrated in FIG. 3.

The first TxPSD 402, a first TxMI 408, and a first TxICI 406 produce a first RxPSD 422, an RxMI 428, and an RxICI 426 at the AP 106. The second TxPSD 404 produce a second RxPSD 424 at the AP 106. The second TxMI 418 and the second TxICI 416 are sufficiently attenuated by the link between the station STA2 and the AP 106 that they have no effect on reception of signals at the AP 106, and therefore the respective RxMI and RxICI thereof are not shown.

The transmission powers of the first and second transmissions are selected so that the RxMI 428 and the RxICI 426 do not prevent or substantially impede reception of the second transmission. In an embodiment, the transmission powers of the first and second transmissions are selected so that the first RxPSD 422 is substantially equal to the second RxPSD 424.

In another embodiment, the transmission powers of the first and second transmissions are selected so that the RxMI 428 and the RxICI 426 are less than the second RxPSD 424 in those frequencies that overlap with the second RxPSD 424 by an amount corresponding to a Signal to Interference and Noise Ratio (SINR) associated for which communications are acceptably reliable for a data rate and a Modulation and Coding Scheme (MCS) of the second transmission.

Figure 5A:
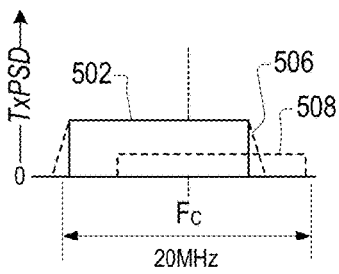
FIGS. 5A-5C illustrate interference between UL OFDMA transmissions in a wireless network according to an embodiment.
Figure 5C:
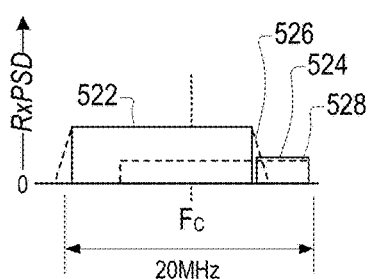
Figure 5B:
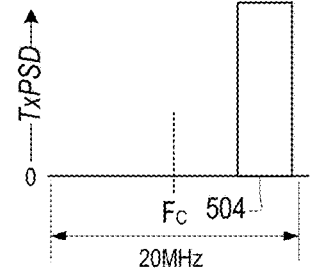

FIG. 5 shows a second scenario where transmission of packets from multiple stations without power control can cause issues at a receiving device. In FIG. 5, FIG. 5A shows a first Transmission Power Spectral Density (TxPSD) 502 of a first transmission from the station STA1 of the BSS 100 of FIG. 1. FIG. 5B shows a second TxPSD 504 of a second transmission from the station STA2 of the BSS 100. FIG. 5C shows first and second Received Power Spectral Densities (RxPSDs) 526 and 524 of the first and second transmissions at the AP 106 of the BSS 100.

FIG. 5 shows a scenario where stations STA1 and STA2 are transmitting packets simultaneously and at equal transmission powers. Because the second transmission from station STA2 has a narrower bandwidth than the first transmission from the station STA1, the second TxPSD 504 of the second transmission is higher than the first TxPSD 502 of the first transmission. As in FIGS. 3 and 4, STA2 has a link to the AP 106 with large path loss and/or penetration loss which substantially attenuates the power at the AP 106 of the second transmission from the station STA2.

FIG. 5 illustrates the system performing UL-OFDMA, with the first transmission from station STA1 may be assigned to a first set of frequency allocations corresponding to three-quarters of the channel and the second transmission from the station STA2 may be assigned to the rest.

The first transmission by the station STA1 may produce a TxMI 508. In addition, a frequency offset difference of the stations STA1 and STA2 may result in a TxICI 506 from the station STA1.

The first TxPSD 502, the TxMI 508, and the TxICI 506 produced by the first transmission are attenuated by the link between the STA1 and the AP 106 to produce a first RxPSD 522, an RxMI 528, and an RxICI 526. The second TxPSD 504 produced by the second transmission is attenuated by the link between the STA2 and the AP 106 to produce a second RxPSD 524.

Because of the higher attenuation in the link between the station STA2 and the AP 106, the second RxPSD 524 of the second transmission is not substantially higher than the RxMI 528 and the RxICI 526 in the frequencies where each of the latter overlaps the second RxPSD 524. As a result, the AP 106 may not be able to receive the second transmission.

FIG. 6 show a method of controlling transmission powers of the stations STA1 and STA2 according to an embodiment. The transmission powers are controlled to prevent the interference associated with a first transmission from a station STA1 from preventing the reception of a contemporaneous second transmission from station STA2, such as was illustrated in FIG. 5.

In FIG. 6, FIG. 6A shows a first TxPSD 602 of a first transmission from the station STA1 of the BSS 100 of FIG. 1. FIG. 6B shows a second TxPSD 604 of a second transmission from the station STA2 of the BSS 100. FIG. 6C shows first and second RxPSDs 622 and 624 of the first and second transmissions at the AP 106 of the BSS 100.

In FIG. 6, the transmission power of the first transmission of the station STA1 may be reduced relative to the transmission power of the second transmission of the station STA2. As a result, the first TxPSD 602, a TxMI 608, and a TxICI 606 are also reduced relative to the example illustrated in FIG. 5.

The transmission power of the second transmission may remain the same as in FIG. 5 or may be increased. As a result, the second TxPSD 604 may remain the same or be increased relative to the example illustrated in FIG. 5.

The first TxPSD 602, a TxMI 608, and a TxICI 606 produce a first RxPSD 622, an RxMI 628, and an RxICI 626 at the AP 106. The second TxPSD 604 produces a second RxPSD 624 at the AP 106.

The transmission powers of the first and second transmissions are selected so that the RxMI 628 and the RxICI 626 do not prevent or substantially impede reception of the second transmission. In an embodiment, the transmission powers of the first and second transmissions are selected so that the first RxPSD 622 is substantially equal to the second RxPSD 624.

In another embodiment, the transmission powers of the first and second transmissions are selected so that the RxMI 628 and the RxICI 626 are less than the second RxPSD 624 in those frequencies that overlap with the second RxPSD 624 by an amount corresponding to a SINR) for which communications are acceptably reliable for a data rate and a Modulation and Coding Scheme (MCS) of the second transmission.

FIG. 7 shows a third scenario where transmission of packets from multiple stations without power control can cause issues at a receiving device. In FIG. 7, FIG. 7A shows a first Transmission Power Spectral Density (TxPSD) 702 of a first transmission from the station STA1 of the BSS 100 of FIG. 1. FIG. 7B shows a second TxPSD 704 of a second transmission from the station STA2 of the BSS 100. FIG. 7C shows first and second Received Power Spectral Densities (RxPSDs) 726 and 724 of the first and second transmissions at the AP 106 of the BSS 100.

FIG. 7 shows a scenario where stations STA1 and STA2 are transmitting packets simultaneously and at equal TxPSDs, that is, the second TxPSD 704 of the second transmission is substantially equal to the first TxPSD 702 of the first transmission. Because the second transmission from station STA2 has a narrower bandwidth than the first transmission from the station STA1, the transmission power of the second transmission is lower than the transmission power of the first transmission. As in FIGS. 3 and 4, STA2 has a link to the AP 106 with large path loss and/or penetration loss which substantially attenuates the power at the AP 106 of the second transmission from the station STA2.

FIG. 7 illustrates the system performing UL-OFDMA, with the first transmission from station STA1 may be assigned to a first set of frequency allocations corresponding to three-quarters of the channel and the second transmission from the station STA2 may be assigned to the rest.

The first transmission by the station STA1 may produce a TxMI 708. In addition, a frequency offset difference of the stations STA1 and STA2 may result in a TxICI 706 from the station STA1.

The first TxPSD 702, the TxMI 708, and the TxICI 706 produced by the first transmission are attenuated by the link between the STA1 and the AP 106 to produce a first RxPSD 722, an RxMI 728, and an RxICI 726. The second TxPSD 704 produced by the second transmission is attenuated by the link between the STA2 and the AP 106 to produce a second RxPSD 724.

Because of the higher attenuation in the link between the station STA2 and the AP 106, the second RxPSD 724 of the second transmission is not substantially higher than the RxMI 728 and the RxICI 726 in the frequencies where each of the latter overlaps the second RxPSD 724. As a result, the AP 106 may not be able to receive the second transmission.

FIG. 8 show a method of controlling transmission powers of the stations STA1 and STA2 according to an embodiment. The transmission powers are controlled so as to prevent the interference associated with a first transmission from a station STA1 from preventing the reception of a contemporaneous second transmission from station STA2, such as was illustrated in FIG. 7.

In FIG. 8, FIG. 8A shows a first TxPSD 802 of a first transmission from the station STA1 of the BSS 100 of FIG. 1. FIG. 8B shows a second TxPSD 804 of a second transmission from the station STA2 of the BSS 100. FIG. 8C shows first and second RxPSDs 822 and 824 of the first and second transmissions at the AP 106 of the BSS 100.

In FIG. 8, the first TxPSD 802 of the first transmission of the station STA1 may be reduced relative to the second TxPSD 804 of the second transmission of the station STA2. As a result, a TxMI 808 and a TxICI 806 are also reduced relative to the example illustrated in FIG. 7.

The second TxPSD 804 of the second transmission may remain the same as in FIG. 7 or, as shown in FIG. 8B, may be increased.

The first and second TxPSDs 802 and 804 may be reduced or increased by reducing or increasing the transmission power of the first and second transmissions, respectively.

The first TxPSD 802, the TxMI 808, and the TxICI 806 produce a first RxPSD 822, an RxMI 828, and an RxICI 826 at the AP 106. The second TxPSD 804 produces a second RxPSD 824 at the AP 106.

The TxPSDs of the first and second transmissions are selected so that the RxMI 828 and the RxICI 826 do not prevent or substantially impede reception of the second transmission. In an embodiment, the transmission powers of the first and second transmissions are selected so that the first RxPSD 822 is substantially equal to the second RxPSD 824.

In another embodiment, the transmission powers of the first and second transmissions are selected so that the RxMI 828 and the RxICI 826 are less than the second RxPSD 824 in those frequencies that overlap with the second RxPSD 824 by an amount corresponding to a SINR for which communications are acceptably reliable for a data rate and a Modulation and Coding Scheme (MCS) of the second transmission.

Figure 9:
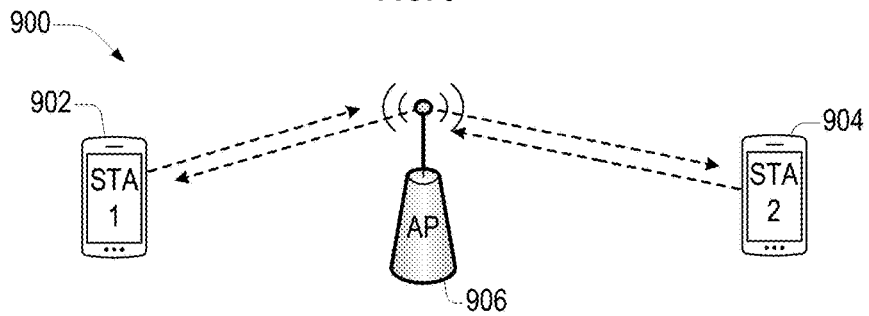
FIG. 9 illustrates a wireless network according to an embodiment.

FIG. 9 illustrates a wireless network according to another embodiment. The wireless network includes an infrastructure BSS 900 of a WLAN. The BSS 900 includes an AP 906 wirelessly communicating with first and second stations 902 and 904 (also referred to as STA1 and STA2, respectively).

The AP 906, the first station 902, and the second station 904 may be substantially similar to the AP 106, the first station 102, and the second station 104, respectively, of FIG. 1.

Figure 10A:
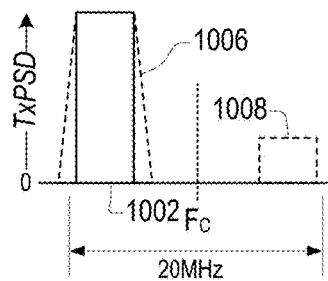
FIGS. 10A-10C illustrate interference between UL OFDMA transmissions in a wireless network according to an embodiment.
Figure 10C:
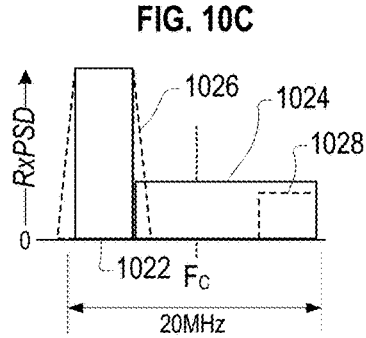
Figure 10B:
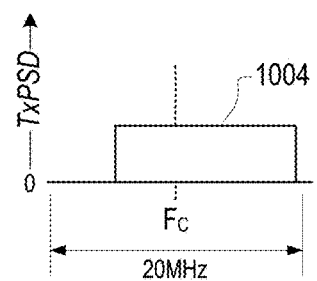

FIG. 10 shows a fourth scenario where transmission of packets from multiple stations without power control can cause issues at a receiving device. In FIG. 10, FIG. 10A shows a first Transmission Power Spectral Density (TxPSD) 1002 of a first transmission from the station STA1 of the BSS 900 of FIG. 9. FIG. 10B shows a second TxPSD 1004 of a second transmission from the station STA2 of the BSS 900. FIG. 10C shows first and second Received Power Spectral Densities (RxPSDs) 1026 and 1024 of the first and second transmissions at the AP 906 of the BSS 900.

FIG. 10 shows a scenario where stations STA1 and STA2 are transmitting packets simultaneously and at equal transmission powers. Because the first transmission from station STA1 has a narrower bandwidth than the second transmission from the station STA2, the first TxPSD 1002 of the first transmission is higher than the second TxPSD 1004 of the second transmission.

FIG. 10 illustrates the system performing UL-OFDMA. Accordingly, the first transmission from station STA1 may be assigned to a first set of frequency allocations corresponding to one-quarter of the channel and the second transmission from the station STA2 may be assigned to the rest.

The first transmission by the station STA1 may produce a TxMI 1008. In addition, a frequency offset difference of the stations STA1 and STA2 may result in a TxICI 1006 from the station STA1.

The first TxPSD 1002, the TxMI 1008, and the TxICI 1006 produced by the first transmission produce a first RxPSD 1022, an RxMI 1028, and an RxICI 1026. The second TxPSD 1004 produced by the second transmission produces a second RxPSD 1024.

Because of the higher TxPSD of the first transmission, the second RxPSD 1024 of the second transmission is not substantially higher than the RxMI 1028 and the RxICI 1026 in the frequencies where each of the latter overlaps the second RxPSD 1024. As a result, the AP 906 may not be able to receive the second transmission.

FIG. 11 show a method of controlling transmission powers of the stations STA1 and STA2 according to an embodiment. The transmission powers are controlled to prevent the interference associated with a first transmission from a station STA1 from preventing the reception of a contemporaneous second transmission from station STA2, such as was illustrated in FIG. 11.

Figure 11A:
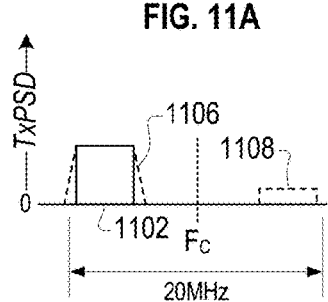
FIGS. 11A-11C illustrate reducing interference between UL OFDMA transmissions by controlling transmission power of STAs according to an embodiment.
Figure 11C:
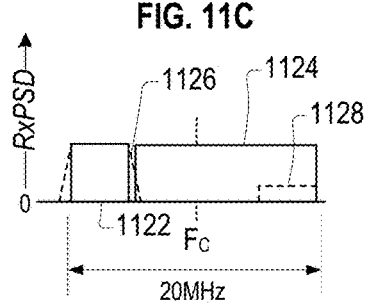
Figure 11B:
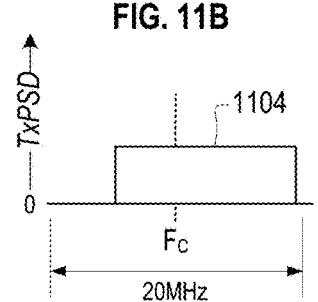

In FIG. 11, FIG. 11A shows a first TxPSD 1102 of a first transmission from the station STA1 of the BSS 900 of FIG. 9. FIG. 11B shows a second TxPSD 1104 of a second transmission from the station STA2 of the BSS 900. FIG. 11C shows first and second RxPSDs 1122 and 1124 of the first and second transmissions at the AP 906 of the BSS 900.

In FIG. 11, a transmission power of the first transmission of the station STA1 may be reduced relative to a transmission power of the second transmission of the station STA2.

As a result, the first TxPSD 1102, a TxMI 1108, and a TxICI 1106 are reduced relative to the example illustrated in FIG. 10.

The transmission power of the second transmission may remain the same as in FIG. 10, as shown in FIG. 11B, or may be increased. As a result, the second TxPSD 1104 may remain the same or be increased relative to the example illustrated in FIG. 10.

The first TxPSD 1102, the TxMI 1108, and the TxICI 1106 produce a first RxPSD 1122, an RxMI 1128, and an RxICI 1126 at the AP 906. The second TxPSD 1104 produces a second RxPSD 1124 at the AP 906.

The transmission powers of the first and second transmissions are selected so that the RxMI 1128 and the RxICI 1126 do not prevent or substantially impede reception of the second transmission. In an embodiment, the transmission powers of the first and second transmissions are selected so that the first RxPSD 1122 is substantially equal to the second RxPSD 1124.

In another embodiment, the transmission powers of the first and second transmissions are selected so that the RxMI 1128 and the RxICI 1126 are less than the second RxPSD 1124 in those frequencies that overlap with the second RxPSD 1124 by an amount corresponding to a SINR for which communications are acceptably reliable for a data rate and a Modulation and Coding Scheme (MCS) of the second transmission.

Figure 12:
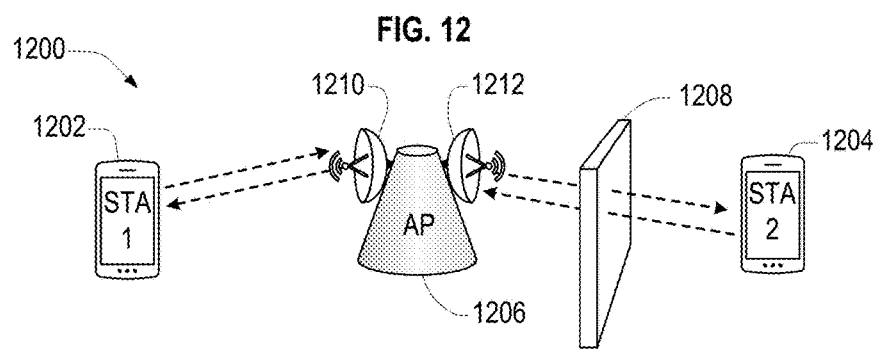
FIG. 12 illustrates a wireless network according to an embodiment.

FIG. 12 illustrates a wireless network according to another embodiment. The wireless network includes an infrastructure BSS 1200 of a WLAN. The BSS 1200 includes an AP 1206 wirelessly communicating with first and second stations 1202 and 1204 (also referred to as STA1 and STA2, respectively).

The AP 1206 may be similar to the AP 106 of FIG. 1, except that the AP 1206 includes first and second directional antennas 1210 and 1212. The first directional antenna 1210 provides a substantially higher gain for signals received from a first direction corresponding to a direction of the station STA1 relative to signals received from a second direction corresponding to a direction of the station STA2. The second directional antenna 1212 provides a substantially higher gain for signals received from the second direction relative to signals received from the first direction.

Although the AP 1206 is shown using first and second directional antennas 1210 and 1212, embodiments are not limited thereto. In an embodiment, the AP 1206 may include one or more of an additional directional antennas, arrays of beam-formed antennas, combinations thereof, and the like.

The first station 1202 and the second station 1204 may be similar to the first station 102 and the second station 104, respectively, of FIG. 1.

In the example illustrated in FIGS. 12-14, the AP 1206, first station 1202, and the second station 1204 are configured to perform UL SDMA communications, in which each of the first and second stations 1202 and 1204 simultaneously transmit first and second transmissions, respectively, using all of a same channel. The AP 1206 may be configured to receive the first transmission using the first directional antenna 1210 and to receive the second transmission using the second directional antenna 1210, relying on the directional properties of the antennas 1210 and 1212 to separate the two transmissions.

FIG. 12 shows a wall 1208 in the transmission path between the AP 1206 and the station STA2. The wall 1208 attenuates signals passing between the AP 1206 and the station STA2. For example, the wall 1208 may introduce 20 decibels (dB) of attenuation when the wall 1208 includes concrete, and may introduce 6 decibels (dB) of attenuation when the wall 1208 includes drywall. The signal attenuation attributable to the wall may interfere with operations of the BSS 1200, as described below.

Figure 13A:
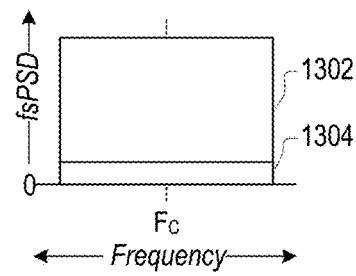
FIGS. 13A-13C illustrate interference between Up-Link (UL) Spatial Division Multiple Access (SDMA) transmissions in a wireless network according to an embodiment.

FIG. 13 shows a scenario where transmission of packets from multiple stations without power control can cause issues at a receiving device. In FIG. 13, FIG. 13A shows first and second free-space PSDs (fsPSDs) 1302 and 1304 of the first and second transmissions, respectively, in the immediate vicinity of the AP 1206 of the BSS 1200 of FIG. 12. An fsPSD corresponds to an RxPSD that would be produced using an 0 dB-gain omnidirectional antenna.

Figure 13B:
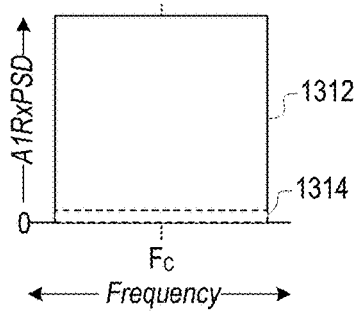
Figure 13C:
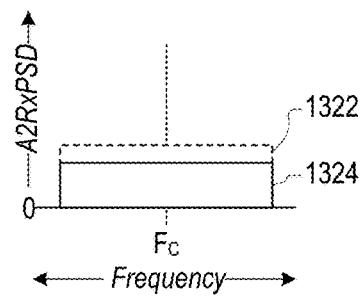

FIG. 13B shows first and second Antenna 1 RxPSDs (A1RxPSDs) 1312 and 1314 of the first and second transmissions, respectively, as received by the first directional antenna 1210. FIG. 13C shows first and second Antenna 2 RxPSDs (A2RxPSDs) 1312 and 1314 of the first and second transmissions, respectively, as received by the second directional antenna 1212.

FIG. 13 shows a scenario where stations STA1 and STA2 are transmitting packets simultaneously and at equal transmission powers and equal TxPSDs while performing UL-SDMA. Accordingly, the first transmission from station STA1 may be assigned to a same set of frequency allocations as the second transmission from the station STA2.

Because of the higher attenuation of the link between the station STA2 and the AP 1206 relative to the link between the station STA1 and the AP 1206, the fsPSD 1302 at the AP 1206 of the first transmission is substantially higher than the fsPSD 1305 at the AP 1206 of the second transmission.

The directional antennas 1210 and 1212 produce respective RxPSDs according to the fsPSDs at the AP 1206 of respective transmissions and the antenna's directional properties. As a result, the first A1RxPSD 1312 of the first transmission as received by the first directional antenna 1210 is even higher relative to the second A1RxPSD 1314 of the second transmission as received by the first directional antenna 1210 than the difference between the first and second fsPSDs 1302 and 1304, and the AP 1206 may therefore receive the first transmission without unacceptable interference from the second transmission.

However, in the example shown in FIG. 13, the directional gain of the second directional antenna 1212 is insufficient to compensate for the attenuation of the second transmission produced by the wall 1208. As a result the first A2RxPSD 1322 of the first transmission as received by the second directional antenna 1212 is higher than the second A2RxPSD 1324 of the second transmission as received by the second directional antenna 1212, and the AP 1206 may therefore be unable to receive the second transmission because of the interference produced by the first transmission.

For example, if the first and second transmissions are performed with same transmission powers and TxPSDs, the wall 1208 causes the attenuation of the link from the station STA2 to the AP 1206 to be 20 dB greater than the attenuation of the link from the station STA1 to the AP 1206, and the directional antenna 1212 provides 12 dB more gain to the second transmission than to the first transmission, the first A2RxPSD 1322 of the first transmission will be 8 dB higher than the second A2RxPSD 1324 of the second transmission.

FIG. 14 show a method of controlling transmission powers of the stations STA1 and STA2 according to an embodiment. The transmission powers are controlled to prevent a first transmission from a station STA1 from preventing the reception of a contemporaneous second transmission from station STA2, such as was illustrated in FIG. 13.

Figure 14A:
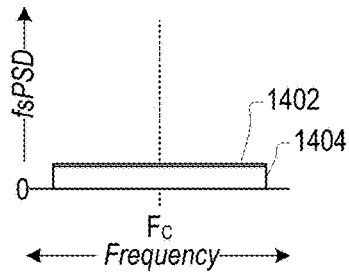
FIGS. 14A-14C illustrate reducing interference between UL SDMA transmissions by controlling transmission power of STAs according to an embodiment.
Figure 14B:
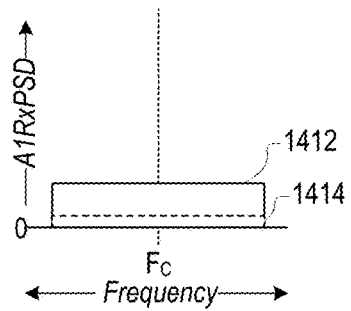
Figure 14C:
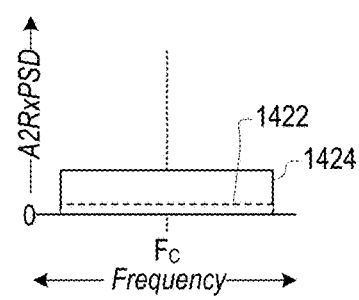

In FIG. 14, FIG. 14A shows first and second free-space PSDs (fsPSDs) 1402 and 1404 of the first and second transmissions, respectively, in the immediate vicinity of the AP 1206 of the BSS 1200 of FIG. 12. FIG. 14B shows first and second Antenna 1 RxPSDs (A1RxPSDs) 1412 and 1414 of the first and second transmissions, respectively, as received by the first directional antenna 1210. FIG. 14C shows first and second Antenna 2 RxPSDs (A2RxPSDs) 1412 and 1414 of the first and second transmissions, respectively, as received by the second directional antenna 1212.

In FIG. 14, a transmission power of the first transmission of the station STA1 may be reduced relative to a transmission power of the second transmission of the station STA2. As a results, the first fsPSDs 1402, the first A1RxPSDs 1412, and the first A2RxPSDs 1422 are reduced relative to the example illustrated in FIG. 13.

The transmission power of the second transmission may remain the same as in FIG. 13, as shown in FIG. 14B, or may be increased. As a result, the second fsPSDs 1404, the second A1RxPSDs 1414, and the second A2RxPSDs 1424 may remain the same or be increased relative to the example illustrated in FIG. 13.

The transmission powers of the first and second transmissions are selected so that the first A1RxPSDs 1412 is substantially greater than the second A1RxPSDs 1414 and the second A2RxPSDs 1424 is substantially greater than the first A2RxPSDs 1422, so that the first and second transmissions do not prevent or substantially impede reception of each other.

In an embodiment, the transmission powers of the first and second transmissions are selected so that the first and second fsPSDs 1402 and 1404 are substantially equal, as sown in FIG. 14A. In such an embodiment, the directional gain of the directional antennas 1210 and 1212 will operate to produce the desired relative RxPSDs, as shown in FIGS. 14B and 14C.

In the embodiments illustrated in FIGS. 1 to 14, an amount of transmission power adjustment may be limited by various factors, such as a dynamic transmission power configuration range of a station, which may include one or more of a minimum transmission power and a maximum transmission power of a station.

Figure 15:
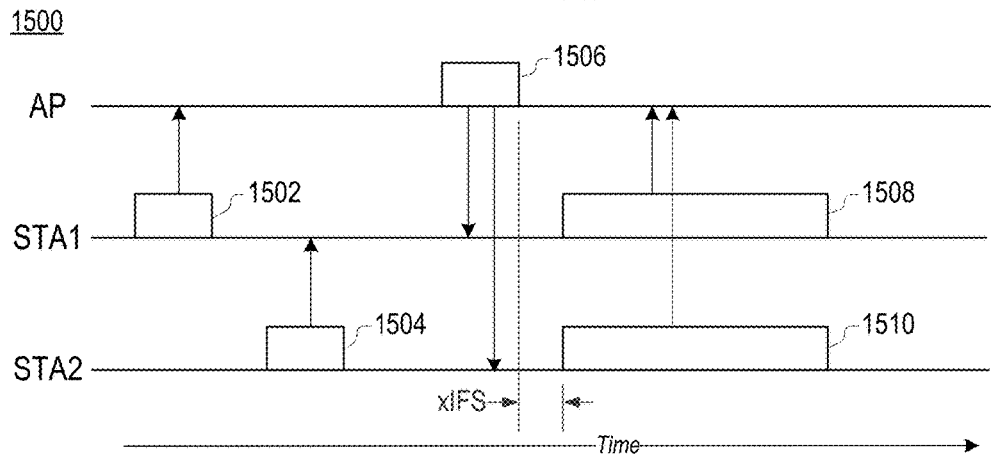
FIGS. 15 and 16 illustrate processes for controlling transmission power of stations participating in an UL OFDMA/SDMA communication according to embodiments.

Also, in an embodiment, a maximum transmission power of OFDMA/SDMA frames may be configured separately from a maximum transmission power for non-OFDMA/SDMA frames, and a nominal transmission power of OFDMA/SDMA frames may be configured separately from a nominal transmission power of non-OFDMA/SDMA frames FIG. 15 illustrates a process 1500 for dynamically controlling power in UL OFDMA and UL SDMA communications. The power control of the UL OFDMA/SDMA frame(s) may be specific to the UL OFDMA/SDMA frames and the transmission power of the non-OFDMA/SDMA packets may be separately controlled.

FIG. 15 shows frames being communicated between an AP and stations STA1 and STA2. The frames include first and second prior frames 1502 and 1504, an initiating frame 1506, and first and second uplink frames 1508 and 1510. The uplink frames 1508 and 1510 may both be UL OFDMA frames, or may both be UL SDMA frames, and together comprise an UL OFDMA/SDMA communication.

In an embodiment including 3 or more stations, performing an UL OFDMA/SDMA communication may include simultaneously performing an UL OFDMA communication and an UL SDMA communication. For example, two or more stations may perform an UL OFDMA communication in a first SDMA spatial region while one or more stations perform an OFDMA or non-OFDMA UL communication in a second SDMA spatial region. The process 1500 may control the transmission power of all the stations involved in such a communication.

The AP determines characteristics of the station STA1 and channel characteristics of a link between the station STA1 and the AP using one or more of measurements of the first prior frame 1502 and information included in the first prior frame 1502.

The AP determines characteristics of the station STA2 and channel characteristics of a link between the station STA2 and the AP using one or more of measurements of the second prior frame 1504 and information included in the second prior frame 1504.

The AP transmits the initiating frame 1506 to the stations participating in the upcoming UL OFDMA/SDMA communication, that is, to stations STA1 and STA2 in the example of FIG. 15. The initiating frame 1506 initiates performance of the UL OFDMA/SDMA communication by the stations STA1 and STA2.

The AP includes power control information, including power control parameters, in the initiating frame 1506. The initiating frame 1506 may further include information on frequency allocation and other medium access parameters related to the UL OFDMA/SDMA communication.

The power control parameter sent from the AP may be derived from one or more reported power values, such as one or more of a Received Channel Power Indicator (RCPI), a Received Signal Strength Indicator (RSSI), an Average Noise Power Indicator (ANPI), or a Received Signal to Noise Indication (RSNI), and a measurement of received power of a frame received from a station participating in the UL OFDMA/SDMA communication.

The RCPI is a measure of the received RF power in the selected channel for a received frame. RCPI is a monotonically increasing, logarithmic function of the received power level defined in decibels relative to one milliwatt (dBm). RCPI equals the received RF power within an accuracy of ±5 dB (95% confidence interval) within the specified dynamic range of the receiver The RSSI is a measure by the PHY of the energy observed at the antenna used to receive the current frame. The RSSI is measured during the reception of a preamble of the frame. The RSSI is intended to be used in a relative manner, and is a monotonically increasing function of the received power.

The ANPI represents an average noise plus interference power on a measured channel at the antenna connector during a measurement duration. The RSNI is calculated as the ratio of the received signal power (determined by calculating RCPI-ANPI) to the ANPI.

In the example of FIG. 15, the AP sends the initiating frame 1506 to stations STA1 and STA2. The indication to synchronize transmission from stations STA1 and STA2 is included in the initiating frame 1506. The initiating frame 1506 may also include information related to OFDMA/SDMA scheduling and TXVECTOR parameters to be used for OFDMA/SDMA transmission.

The stations STA1 and STA2 begin transmitting the uplink frames 1508 and 1510, respectively, after an interval xIFS, wherein the interval xIFS may correspond to one of a Short Inter-Frame Space (SIFS), a PCF Inter-Frame Space (PIFS), a DCF Inter-Frame Space (DIFS), an Arbitration Inter-Frame Space (AIFS), and the like.

In an embodiment, the initiating frame 1506 may also include transmission power indications for one or more of the stations STA1 and STA2. If a transmission power indication for one station requires X bits, then N*X bits are needed for controlling respective transmission powers of N STAs.

The transmission power indications for each STA can be determined based on previous reported receive power information, such as RCPIs, received in prior frames 1502 and 1504 transmitted by stations STA1 and STA2, respectively.

The station STA1 determines a transmission power of the first uplink frame 1508 using a corresponding first transmission power indication included in the initiating frame 1506. The station STA2 determines a transmission power of the second uplink frame 1510 using a corresponding second transmission power indication included in the initiating frame 1506.

The stations STA1 and STA2 may each also use additional information received in a beacon frame of the AP to determine respective transmissions powers of the first and second uplink frames 1508 and 1510, such as a local maximum allowable transmission power.

In another embodiment, the initiating frame 1506 may include a common transmission power parameter for all the stations that will participate in the UL OFDMA/SDMA communication. The transmission powers of the first and second uplink frames 1508 and 1510 may be determined using the common transmission power parameter from AP, the nominal transmission power of the AP, and received power measured and reported in prior frames 1502 and 1504 or measured from initiating frame 1506.

Figure 16:
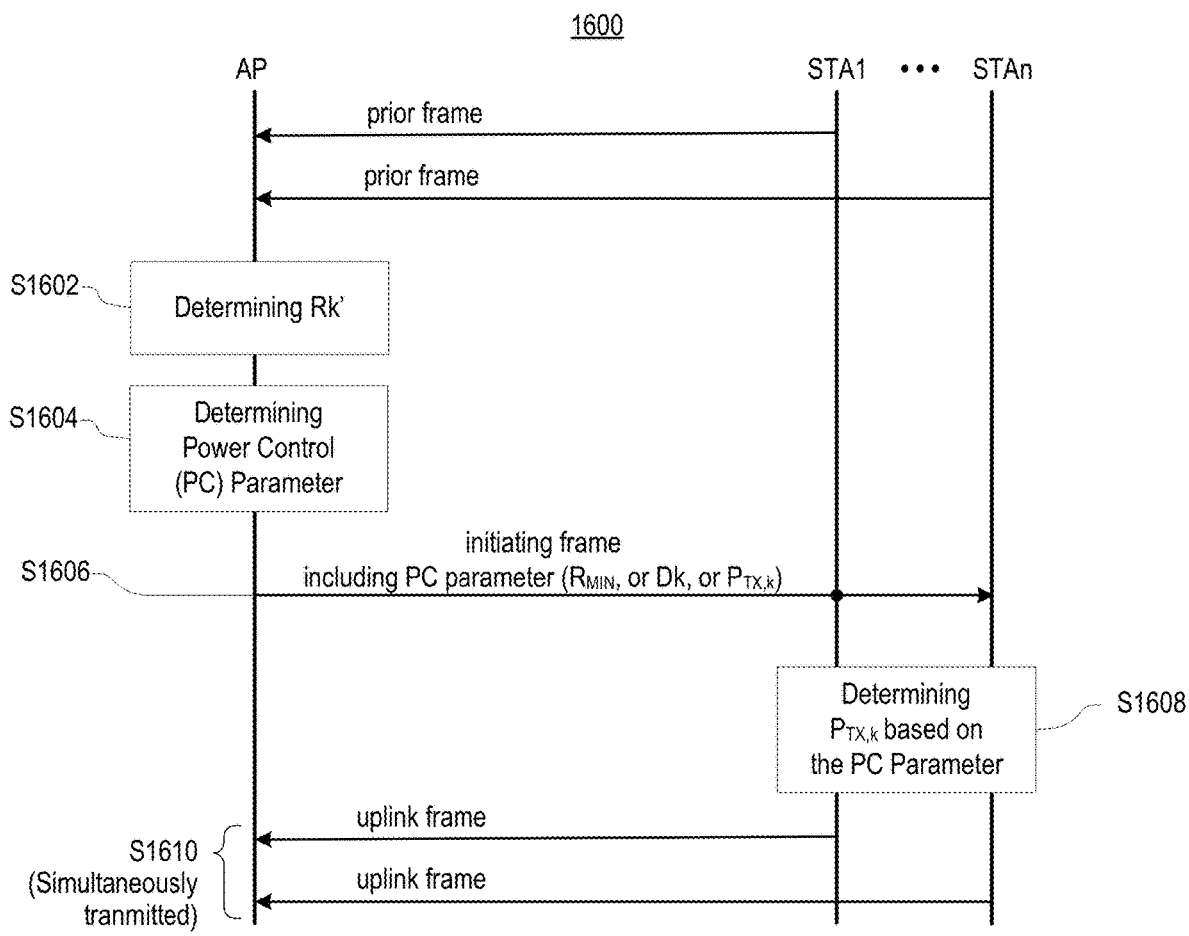

FIG. 16 illustrates a process 1600 for controlling transmission powers of stations participating in an UL OFDMA/SDMA communication according to an embodiment. The process 1600 may be performed by an Access Point (AP) and a plurality of stations STA1 to STAn, such as the AP and the stations STA1 and STA2 shown in each of FIGS. 1, 9, and 12.

The process 1600 is adapted to control the transmission powers so that transmissions from the stations have substantially equal powers or substantially equal power spectrum densities in the vicinity of an AP receiving the UL OFDMA/SDMA communication, within the limits imposed by dynamic transmission configuration power ranges of each of the stations.

At S1602, a plurality of respective received powers Rk' are determined for a plurality of stations STAk, k=1 . . . n, that will participate in an upcoming UL OFDMA/SDMA communication. In an embodiment, each received power Rk' corresponds to a received power spectral density for the respective station STAk. In an embodiment, the received powers Rk' are expressed in a logarithmic unit such as dBm.

In an embodiment, the plurality of received powers $_{Rk'}$ may be determined using measurements, performed by the stations and reported to the AP by the stations using prior frames, of a frame or frames received by the stations from the AP.

In an embodiment, the plurality of received powers Rk' may be determined using measurements, performed by the AP, of prior frames received by the AP from the stations.

The measurements may include one or more of a Received Channel Power Indicator (RCPI), a Received Signal Strength Indicator (RSSI), an Average Noise Power Indicator (ANPI), or a Received Signal to Noise Indication (RSNI).

Pathlosses between each station and the AP may also be determined. A pathloss to a station STA may be determined by transmitting, from the AP, a preliminary frame at a transmission power $TxP_{AP}$ and receiving, by the AP from the station, an estimate or measurement corresponding to a received power $RxP_{STA}$ of the preliminary frame at the station. When the transmission power $TxP_{AP}$ and the received power $RxP_{STA}$ are expressed in decibels, the pathloss in decibels between the AP and the station PL may be determined by subtracting the receive power $RxP_{STA}$ from the transmission power $TxP_{AP}$.

For a plurality of stations STA1 . . . STAn participating in an upcoming UL OFDMA/SDMA communication, the AP may determine a plurality of respective pathlosses $PL_1$ . . . $PL_N$ according to a plurality of respective received powers $RxP_{STA1}$ . . . $RxP_{STAn}$.

In an embodiment, a pathloss between a station and the AP may be used to determine whether the station will be selected to participate in a UL OFDMA/SDMA communication. For example, when a pathloss of a first station is large enough that a maximum-power transmission from the first station will not be receivable over interference caused by a minimum-power transmission of a second station, the first and second stations may not be selected to participate in a same UL OFDMA/SDMA communication as each other.

At S1604 the AP determines one or more power control parameters for the stations participating in the upcoming UL OFDMA/SDMA communication.

In an embodiment, the one or more power control parameters include a common reference power value $R_{MIN}$ corresponding to a minimum value of the plurality of respective received powers Rk'; that is: $R_{MIN}=\min(R1' \ldots Rn')$.

In an embodiment, the one or more power control parameters include respective adjustment parameters Dk for adjusting transmission powers of stations STAk, k=1 . . . n. Each adjustment parameter Dk may correspond to a respective difference between the common reference power value $R_{MIN}$ and the received power Rk'; that is, $Dk=R_{MIN}-Rk'$.

In an embodiment, the one or power control parameters include respective transmission powers $P_{TX,k}$ for each of the stations STAk participating in the upcoming UL OFDMA/SDMA communication. Each transmission power $P_{TX,k}$ may correspond to a sum of respective adjustment parameter Dk and a respective nominal transmission power $P_{NOM,k}$ of the station STAk; that is, $P_{TX,k}=P_{NOM,k}+Dk$.

At S1606 the AP transmits an initiating frame including the one or more power control parameters to the stations participating in the upcoming UL OFDMA/SDMA communication. In an embodiment, the initiating frame includes the common reference power value $R_{MIN}$. In another embodiment, the initiating frame includes the adjustment parameters Dk for the respective stations STAk, k=1 . . . n. In another embodiment, the initiating frame includes the transmission powers $P_{TX,k}$ for the respective stations STAk, k=1 . . . n.

At S1606, the stations receive the initiating frame including the one or more power control parameters for the upcoming UL OFDMA/SDMA communication.

At S1608, each station STAk determines a respective transmission power $P_{TX,k}$ for the upcoming UL OFDMA/SDMA communication. The transmission power $P_{TX,k}$ is determined according to the one or more power control parameters received in the initiating frame.

In an embodiment wherein the one or more power control parameters include a common reference power value $R_{MIN}$, which may corresponding to a minimum value of a plurality of respective received powers Rk' of the stations participating in the UL OFDMA/SDMA communication, the stations determine the respective transmission powers $P_{TX,k}$ according to Equations 1 and 2:

$$Dk=R_{MIN}-Rk', \qquad \text{Equation 1}$$

$$P_{TX,k}=P_{NOM,k}+Dk, \qquad \text{Equation 2}$$

wherein, respectively, Dk is an adjustment parameter, Rk' is a received power, and $P_{NOM,k}$ is a nominal transmission power for the station STAk.

In another embodiment wherein the one or more power control parameters include the respective adjustment parameters Dk for each station STAk participating in the UL OFDMA/SDMA communication, which adjustment parameters Dk may correspond to a difference between a common reference power value $R_{MIN}$ and respective received powers Rk' of the stations STAk, the stations determine the respective transmission powers $P_{TX,k}$ according to Equations 2, above.

In another embodiment wherein the one or more power control parameters include the respective transmission powers $P_{TX,k}$ for each station STAk participating in the UL OFDMA/SDMA communication, the stations use the respective transmission powers $P_{TX,k}$ included in the one or more power control parameters.

The determined transmission powers $P_{TX,k}$ may be used only for the upcoming UL OFDMA/SDMA communication. The determined transmission powers $P_{TX,k}$ may adjust the transmission power of the stations such that received powers at the AP of the transmission of each station during the upcoming UL OFDMA/SDMA communication is approximately equal to respective received powers at the AP of transmission of the other stations participating in the UL OFDMA/SDMA communication.

At S1610, the stations perform respective transmissions as part of the UL OFDMA/SDMA communication. The station performs the transmission at the determined transmission powers $P_{TX,k}$. Each stations transmission is substantially simultaneous with the transmissions of the other stations participating in the UL OFDMA/SDMA communication.

At S1610, the AP receives and processes the UL OFDMA/SDMA communication, wherein transmission powers of the stations participating in the UL OFDMA/SDMA communication are determined using the one or more power control parameters.

In another embodiment, power spectrum density (PSD) may be controlled instead of transmission power when bandwidths of the transmission that makes up the upcoming uplink OFDMA/SDMA communication vary between stations. The power spectrum density may be controlled using the common reference power value $R_{MIN}$ described above.

A receive PSD (i.e. an effective receive power spectral density) Rk for a $k^{th}$ station, in dBm, may be determined according to Equation 3:

$$Rk = P_{MAX,k} - 10 \log 10 \, BWk - PLk \qquad \text{Equation 3}$$

wherein $P_{MAX,k}$ is a maximum transmission power for the $k^{th}$ station in dBm, BWk is an allocated bandwidth of the $k^{th}$ station in the upcoming UL OFDMA/SDMA communication, and PLk is a pathloss between AP and the $k^{th}$ station. The AP may determine Rk from an RCPI of a frame as measured by the $k^{th}$ station, as the RCPI provides $P_{MAX,k}$—PLk information and BWk is known at the AP as it is determined by the AP and signaled to the station. In an embodiment, $P_{MAX,k}$ in Equation 3 can be replaced by a nominal transmission power of the $k^{th}$ station.

An adjustment parameter Dk for the $k^{th}$ station may be determined according to Equation 4:

$$Dk = R_{MIN} - R_k' \qquad \text{Equation 4}$$

wherein the common reference power value $R_{MIN}$ corresponds to a minimum received PSD, in dBm, for all the stations participating in the upcoming UL OFDMA/SDMA communication. $R_k'$ is a receive PSD, in dBm, derived from previously reported RCPI by the STA or from a receive PSD computed from the frame that contains the power control parameters for the upcoming UL OFDMA/SDMA communication. For example, $R_k'$ may be equal to a measurement of a received power of a frame including the power control parameters minus 10 log 10 BW, where BW is a bandwidth allocated to the station in the upcoming UL OFDMA/SDMA communication.

A transmission power $P_{TX,k}$ that the $k^{th}$ station uses during the upcoming UL OFDMA/SDMA communication is determined according to Equation 5:

$$P_{TX,k} = P_{NOM,k} + Dk \qquad \text{Equation 5}$$

wherein $P_{NOM,k}$ is a transmission power of a non-OFDM frame from the $k^{th}$ station (i.e., a nominal transmission power) in dBm. This value can be replaced by $P_{MAX,k}$.

For example, given first and second stations, when $P_{MAX}$=20 dBm (100 mW), BW1=15 MHz, BW2=5 MHz, PL1=70 dB, and PL2=100 dB, then according to Equation 1, R1=20−71.76−70=−121.76 dBm/Hz, and R2=20−66.99−100=−146.99 dBm/Hz, and $R_{MIN}$=R2=−146.99 dBm/Hz. Accordingly, an adjustment parameter D1 of the first station=−146.99+121.76 dB=−25.23 dB, and an adjustment parameter D2 of the second station=−146.99+146.99 dB=0 dB, according to Equation 4. The transmission power $P_{TX,1}$ and $P_{TX,1}$ that the first and station use during the upcoming UL OFDMA/SDMA communication is therefore, according to Equation 5, $P_{TX,1}$=20−25.23 dB=−5.23 dBm (=0.30 mW) and $P_{TX,2}$=20−0 dB=20 dBm (=100 mW), respectively.

Transmission power of each station participating in the uplink OFDM/SDMA communication is controlled by a single (or multiple) power control parameter (common among all STAs) communicated to the stations by the AP. Each station adjusts its transmission power during the uplink OFDMA/SDMA communication by utilizing the nominal receive power from the AP (or pathloss between the AP and the STA) to compute the transmission power density of the frame.

Equations 4 and 5 may be performed by the AP or by a STA participating in the upcoming UL OFDMA/SDMA communication. In an embodiment wherein Equations 4 and 5 are performed by the STAs, the power control parameters may include the common reference power value $R_{MIN}$. In an embodiment wherein Equation 4 is performed by the AP and Equation 5 is performed by the STAs, the power control parameters may include the respective adjustment parameters Dk for the stations STAk, k=1 . . . n. In an embodiment wherein Equations 4 and 5 are performed by the AP, the power control parameters may include the respective transmission powers $P_{TX,k}$ for the stations STAk, k=1 . . . n.

In order to get satisfactory performance, it may not always be better to make the receive power density of the stations at the AP the same. Therefore, in an embodiment, additional transmission power adjustment parameter are used to produce receive power spectral density among signals from the stations that are within a predetermined margin.

In above explanations and figures, illustrative embodiments were provided to allow a person of skill in the art to understand and implement embodiments of the disclosure. However, embodiments are not limited thereto, and are therefore not limited to the number of STAs, specific identifications, specific formats, specific number of STAs per identifications, or other specifics of the illustrative embodiments. Furthermore, while in the description and related figures the reference has made to one or more IEEE Std 802.11 standards, embodiments are not limited thereto, and a person of skill in the art in light of the teachings and disclosures herein would understand how the present disclosures apply to any wireless operation that operates in licensed or unlicensed bands.

Embodiments of the present disclosure include electronic devices configured to perform one or more of the operations described herein. However, embodiments are not limited thereto.

Embodiments of the present disclosure may further include systems configured to operate using the processes described herein. The systems may include basic service sets (BSSs) such as the BSSs 100, 900, and 1200 of FIGS. 1, 9, and 12, respectively, but embodiments are not limited thereto.

Embodiments of the present disclosure may be implemented in the form of program instructions executable through various computer means, such as a processor or microcontroller, and recorded in a non-transitory computer-readable medium. The non-transitory computer-readable medium may include one or more of program instructions, data files, data structures, and the like. The program instructions may be adapted to execute the processes and to generate and decode the frames described herein when executed on a device such as the wireless devices shown in FIG. 1.

In an embodiment, the non-transitory computer-readable medium may include a read only memory (ROM), a random access memory (RAM), or a flash memory. In an embodiment, the non-transitory computer-readable medium may include a magnetic, optical, or magneto-optical disc such as a hard disk drive, a floppy disc, a CD-ROM, and the like.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined.

What is claimed is:

1. A method comprising:
   transmitting, by an Access Point (AP), a downlink frame initiating and coordinating an uplink multi-user transmission, wherein the uplink multi-user transmission includes a plurality of uplink frames respectively transmitted by a plurality of respective stations, and wherein the downlink frame includes power control information for the plurality of uplink frames, the power control information including i) a plurality of respective adjustment parameters for adjusting the respective transmission powers of the plurality of uplink frames, and ii) a common reference power value used to determine the respective transmission powers for the plurality of uplink frames; and
   receiving, by the AP, the uplink multi-user transmission, wherein the uplink multi-user transmission is transmitted beginning a Short Inter-Frame Space after the end of the downlink frame and in response to the downlink frame,
   wherein the plurality of uplink frames are transmitted simultaneously,
   wherein each respective adjustment parameters correspond to a difference between the common reference power value and a received power target of the corresponding uplink frame,
   wherein the common reference power value corresponds to a minimum of the received power targets of the plurality of uplink frames, and
   wherein respective transmission powers of the plurality of uplink frames are based on the respective adjustment parameters, the common reference power value, and respective pathlosses between the AP and the plurality of respective stations.

2. The method of claim 1, wherein the common reference power value corresponds to a minimum value of respective received powers of the plurality of stations.

3. The method of claim 1, wherein the adjustment parameters are respectively determined using differences between the common reference power value and received powers of the respective stations.

4. The method of claim 1, wherein the uplink multi-user transmission is i) an Uplink (UL) Orthogonal Frequency Division Multiple Access (OFDMA) communication or ii) an UL Spatial Division Multiple Access (SDMA) communication.

5. The method of claim 1, further comprising determining the power control information using a measurement, by a station of the plurality of stations, of a frame received by the station.

6. The method of claim 1, further comprising:
   performing a measurement of a prior frame, wherein the prior frame was transmitted by a station of the plurality of stations, and
   determining the power control information using a result of the measurement.

7. The method of claim 1, further comprising determining the power control information using respective bandwidth allocations in the uplink multi-user transmission of the plurality of stations.

8. A method, comprising:
   receiving, by a station from an Access Point (AP), a downlink frame initiating and coordinating an uplink multi-user transmission, wherein the uplink multi-user transmission includes a plurality of uplink frames respectively transmitted by a plurality of respective stations, and wherein the downlink frame includes power control information for the plurality of uplink frames;
   participating in the uplink multi-user transmission by transmitting an uplink frame of the plurality of uplink frames beginning a Short Inter-Frame Space after the end of the downlink frame and in response to the downlink frame, including transmitting the uplink frame simultaneously to the transmissions of the other frames of the plurality of uplink frames,
   wherein the power control information includes a plurality of respective adjustment parameters for adjusting the respective transmission powers of the plurality of uplink frames, the plurality of respective adjustment parameters including an adjustment parameter for the station,
   wherein the power control information further includes a common reference power value used to determine the respective transmission powers for the plurality of uplink frames,
   wherein each respective adjustment parameters correspond to a difference between the common reference power value and a received power target of the corresponding uplink frame, wherein the common reference power value corresponds to a minimum of the received power targets of the plurality of uplink frames, and wherein a transmission power of the uplink frame is based on the adjustment parameter for the station, the common reference power value, and a pathloss between the station and the AP.

9. The method of claim 8, wherein a transmission power of the uplink frame is determined using a difference between the common reference power value and a received power.

10. The method of claim 9, wherein the received power is a received power of the downlink frame.

11. The method of claim 8, further comprising determining the transmission power of the uplink frame using a bandwidth allocation of the uplink frame.

12. The method of claim 11, further including determining the transmission power of the uplink frame according to equations:

$$R' = P - 10 \log 10 \, BW, \text{ and}$$

$$D = R_{MIN} - R', \text{ and}$$

$$P_{TX} = P_{NOM} + D,$$

wherein D is the bandwidth adjustment parameter in decibels, P is a received power in decibels, BW is a bandwidth allocation of the uplink frame, $R_{MIN}$ is the common reference power value in decibels, $P_{TX}$ is the transmission power, and $P_{NOM}$ is i) a nominal transmission power of a non-Orthogonal Frequency Division Multiple Access frame, or ii) a maximum allowable transmission power of the uplink frame.

13. The method of claim 8, wherein the uplink multi-user transmission is i) an Uplink (UL) Orthogonal Frequency Division Multiple Access (OFDMA) communication or ii) an UL Spatial Division Multiple Access (SDMA) communication.

* * * * *